United States Patent
Brewer (10) Patent No.: US 10,105,773 B1
(45) Date of Patent: Oct. 23, 2018

(54) BOX JOINT BLADE SYSTEM

(75) Inventor: James M. Brewer, Mocksville, NC (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1412 days.

(21) Appl. No.: 10/933,138

(22) Filed: Sep. 2, 2004

(51) Int. Cl.
    *B27C 9/00*     (2006.01)
    *B27M 1/00*     (2006.01)
    *B23D 61/06*     (2006.01)
    *B23D 61/02*     (2006.01)

(52) U.S. Cl.
    CPC ......... *B23D 61/065* (2013.01); *B23D 61/023* (2013.01)

(58) Field of Classification Search
USPC .................. 83/838, 836; 144/237, 222, 236; 409/230, 222
See application file for complete search history.

(56) References Cited

U.S. PATENT DOCUMENTS

| | | | | |
|---|---|---|---|---|
| 486,874 | A | * | 11/1892 | Huther .......................... 144/222 |
| 588,082 | A | * | 8/1897 | Perkins .......................... 144/222 |
| 2,592,382 | A | * | 4/1952 | Blais ................................ 407/31 |
| 5,309,962 | A | * | 5/1994 | McCord et al. ............... 144/237 |
| 6,367,524 | B1 | * | 4/2002 | Brewer .......................... 144/371 |
| 7,013,784 | B2 | * | 3/2006 | Lowder et al. ................. 83/848 |

OTHER PUBLICATIONS

Selected pages from Internet web site at www.lowes.com, regarding "Choosing Circular Saw Blades" original publication date unknown, pages printed on Apr. 21, 2004.
Selected pages from Internet web site at www.oldham-usa.com, regarding "Saw Blade Components and Tip Configurations" original publication date unknown, pages printed on Apr. 21, 2004.
*Guidelines for Carbide-Tip Sawing on Table Saws and Radial Saws*, Forrest Manufacturing Company, Inc. Clifton, NJ 07014, © 2002, 8 pages.

* cited by examiner

*Primary Examiner* — Omar Flores Sanchez
(74) *Attorney, Agent, or Firm* — Maginot Moore & Beck LLP (57) ABSTRACT

A box-joint blade system includes left- and right-directed blades that each include a saw plate, a set of saw tips, and a set of gullets disposed between the tips. The tips of each blade are axially offset from the saw plate in opposite directions, such that the blades may be mounted on the axis of the saw in either a first configuration, with left and right saw tips outwardly offset and producing a wide cut, or a second configuration, with the tips inwardly offset and producing a narrow cut. In at least the second configuration, the tips of each blade are disposed within the gullets of the other. The tips optionally have a positive hook angle of up to 20° or more, to produce a smooth, flat-bottomed groove in a workpiece.

24 Claims, 8 Drawing Sheets

BOX JOINT BLADE SYSTEM

FIELD OF THE INVENTION

The present invention relates to a system for forming box joint cuts in a workpiece.

BACKGROUND OF THE INVENTION

When wooden boxes, drawers, and the like are made, substantial attention must be paid to the manner in which the pieces of wood that form the sides of the box are joined together, typically at a 90° angle. Woodworkers are skilled at making a number of types of joints, including dovetail joints and box joints, in order to permit assembly of the box in a manner that results in a solid and secure joining of the sides. The primary difference between a box joint and a dovetail joint is that in a box joint, the tails and pins are square cut all the way through the joint, while in a dovetail joint, the cuts are made at interlocking angles.

Conventionally, box joints are formed in one of four ways. The cuts can be made using a table saw, with a standard flat-top blade with a kerf width, for example, of ⅛", with multiple passes made to create each finger. This presents a number of disadvantages. This method is time-consuming; a 6-inch-deep box might require 12 fingers per side, or 48 per box, which could be 144 cuts for each box. Also, because a large number of cuts are being made, there is excessive wear on the blade as well as the possibility of a varied groove depth.

Another method of cutting box joints is to use a table saw with a stacked dado cutter. This method solves the problem of repetitive cuts with a table saw and standard blade, but other problems arise in application. The dado cutter must be shimmed to the appropriate cut width. More significantly, the grind geometry of a dado cutter is not designed to give the cleanest cut when applied to the orientation of the box joint; a dado is instead designed to cut grooves in a ripping orientation or a cross-cutting orientation. Additionally, scoring at the corners of the dado would be highly evident on a box joint.

A third method of cutting box joints is to dispense with the table saw entirely and instead use a straight bit on a router table. However, in such an arrangement the wood is on end, with its narrow edge against the fence. Because the cutting rotation is oriented differently from the cutting rotation in a table saw, this arrangement is more susceptible to slight movements of the wood from perfect contact with the fence. Any slight movement of the wood workpiece will be revealed in the cut.

Still another method of cutting box joints is to use a dovetail jig. However, these methods are expensive and complex, and the quality of the cut with a rotating bit is not as good as that made with a saw blade. This method is therefore generally regarded as inferior.

Additionally, these joints could be cut by hand using a saw and a chisel, but this is an extremely time-consuming process that requires a great deal of skill and practice.

What is needed, therefore, is a box joint cutting system that does not require multiple passes for each finger, that produces smooth, flat-bottom grooves, and that may be easily set up to produce cuts of standard sizes.

SUMMARY OF THE INVENTION

In accordance with the aforementioned need, the present invention is a system for cutting box joints in which each finger of the box joint is produced in a single pass, which system produces smooth, flat-bottom grooves, and which may be set up easily in order to produce cuts of standard sizes, particularly using a single set of blades specific to the purpose of cutting box joints.

The present invention includes a blade apparatus for a rotary saw having an axis, in which apparatus is included left- and right-directed blade members that each include a saw plate, a number of saw tips, and a like number of gullets disposed between the saw tips. The left- and right-directed blade members may be distinguished principally in that the saw tips of the left-directed blade are axially offset to the left of the saw plate and the saw tips of the right-directed blade are axially offset to the right of the saw plate.

The blade members are axially mounted upon the axis in either of two configurations: a first configuration, in which the left saw tips and right saw tips are outwardly offset to product a wide cut, or a second configuration, in which the left saw tips and the right saw tips are inwardly offset to produce a narrow cut. In at least the second configuration, a portion of each of the saw tips of each of the blade members is disposed within one of the gullets of the other blade member.

In another feature of the present invention, each of the saw tips is provided with a positive hook angle. Variously, the hook angle may be greater than about 10°, about 15°, or about 20°.

Additionally, the blade members may be arranged to create a smooth flat-bottomed groove suitable for forming a box joint in a work piece.

In a further feature of the present invention, the blade members are configured for cooperating engagement in at least the second configuration.

Although the width of the cut may be determined principally by the arrangement of the blade members on the axis, in an alternative embodiment the present invention may include at least one shim disposed between the blade members to vary the width of the cut.

The present invention also includes a system for forming box joints in a workpiece using a table saw, in which the system includes a first blade mountable upon the table saw and having first tips and first gullets disposed circumferentially upon the blade in spaced relation. The first tips are connected to and axially offset from a first saw plate in a first axial direction. The system also includes a second blade mountable upon the table saw and having second tips and second gullets disposed circumferentially upon the blade in spaced relation. The second tips are connected to and axially offset from a second saw plate in a second axial direction opposite the first axial direction.

The first and second blades are operable together in a first disposition to form in the workpiece a kerf having a first width, and in a second disposition axially reversed from the first disposition to form in the workpiece a kerf having a second width different from the first width. At least a portion of each of the tips extends axially into a corresponding gullet of the other blade.

In another feature of the present invention, the hook angle of the tips is positive, and in various embodiments may be greater than about 10° positive, 15° positive, or 20° positive.

Preferably, the kerf is a flat-bottomed groove. The blades may be configured for cooperating engagement during operation. As in the first description above, the system may be modified to increase the width of the kerf by interposing at least one shim between the first and second blades.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
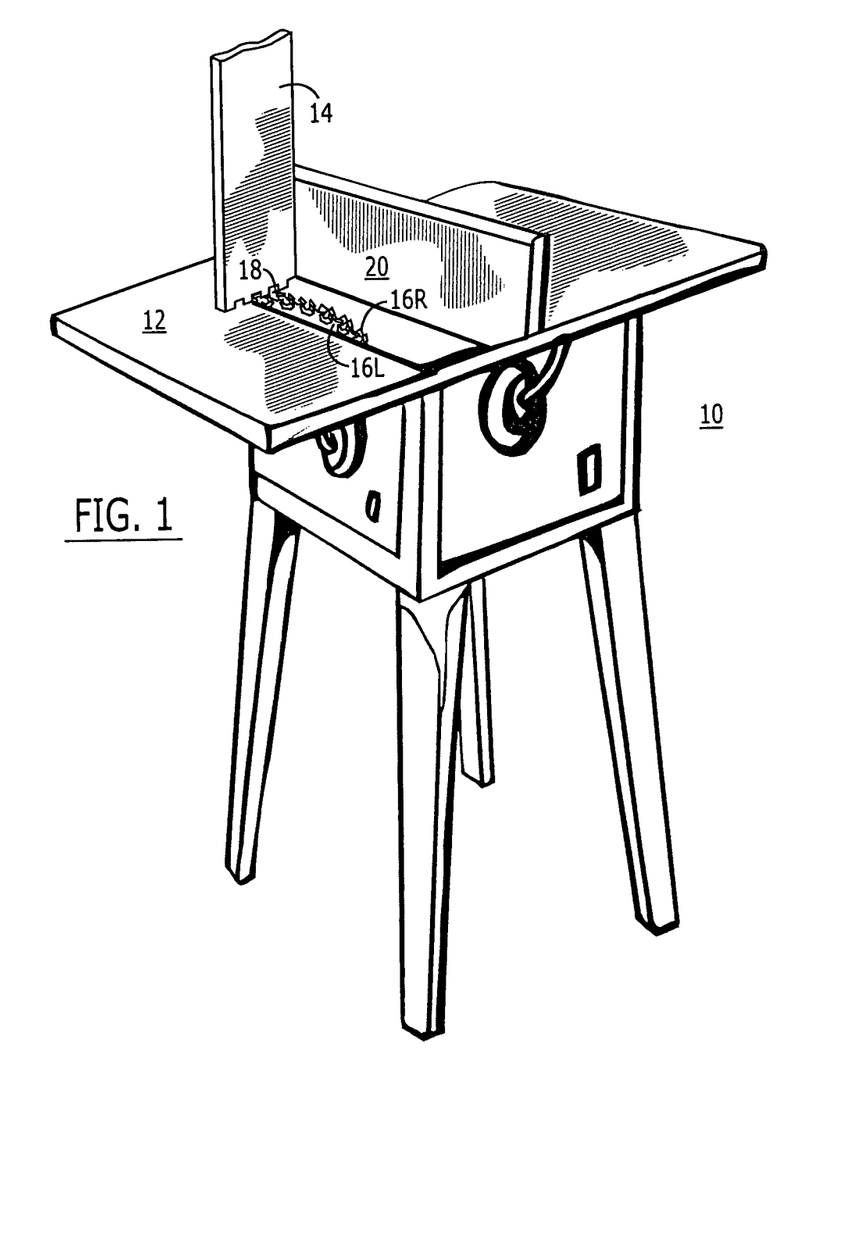
FIG. 1 is a general perspective view of the present invention in a typical environment.

Referring now to the drawings, and more specifically to FIG. 1, a box-joint blade system according to the present invention is shown in a general perspective, environmental view. A table saw 10 has a lateral surface 12 for supporting a workpiece 14 being formed into a side member of a box such as a drawer. The table saw 10 is engaged to drive a pair of blades 16L,16R at high speed to cut a box joint groove 18 of a specified size appropriate to the desired task. In operation, the workpiece 14 is held against a fence 20, which sets the widthwise distance between the edge of the workpiece 14 and the groove 18 being cut, and the workpiece 14 is driven, on end, through the blades 16 to form a groove or kerf 18.

Figure 1A:
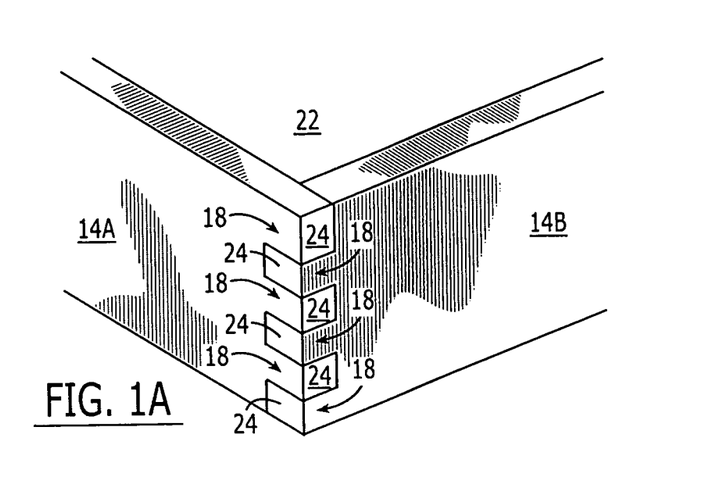
FIG. 1A is a detailed view of a box joint such as may be formed using the present invention.

In FIG. 1A, a box joint 22 of the type typically used to form wooden boxes, drawers, and the like is shown in detail. As can be seen in the figure, and as is well known to those skilled in the art of woodworking, the box joint 22 generally includes an interlockable set of fingers 24 and grooves 18. In each workpiece 14A,14B, the depth of each groove 18 is identical to the thickness of the opposite workpiece 14B, 14A, so that a tight and strong joint may be formed by driving the fingers 24 and grooves 18 into interlocking relation and fastening them mechanically or with glue.

Figure 2:
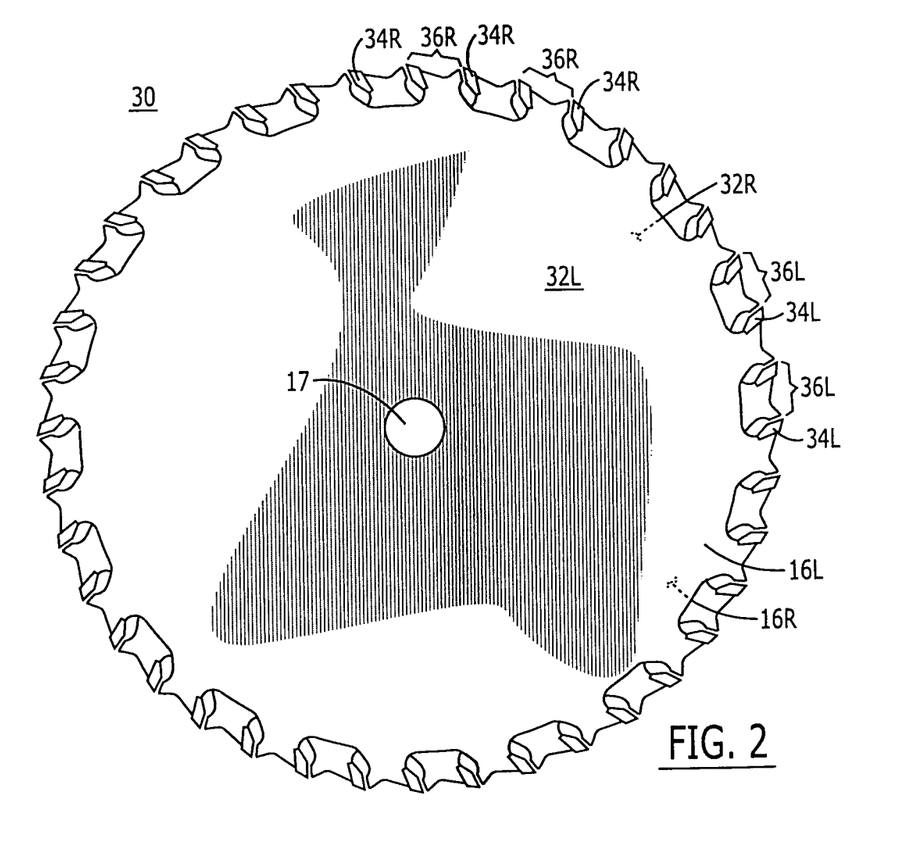
FIG. 2 is a side view of two blades according to the present invention.

In FIG. 2, the blade system 30 is shown in greater detail in an face-on side view. As those skilled in the art will recognize, this description makes use of the terms left and right for clarity in describing relative direction and without an intent to limit the blades to any specific configuration. A left-directed blade member 16L includes a saw plate 32L, a plurality of saw tips 34L disposed circumferentially about the saw plate 32L, and a plurality of gullets 36L disposed between the saw tips 34L.

Figure 3A:
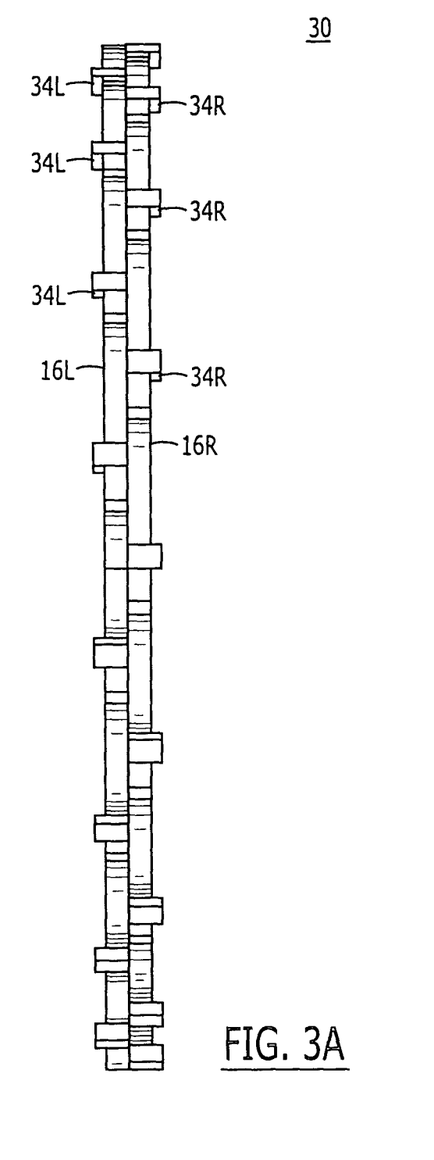
FIGS. 3A-3C are a series of side views of blades according to the present invention, in which the blades are moved from a first to a second disposition on their axis.

As illustrated in FIGS. 2 and 3A, a right-directed blade member 16R includes a saw plate 32R, a plurality of saw tips 34R disposed circumferentially about the saw plate 32R, and a plurality of gullets 36R disposed between the saw tips 34R. As can be seen in the drawing, the saw tips 34R are axially offset to the right of the saw plate 32R. The blade members 16 are mounted at a bore 17 upon an axis of rotation provided as part of the table saw and are driven by a conventional drive motor assembly (not shown).

As in conventional systems, the saw plates 32 are preferably formed of steel, and more particularly stainless steel. The saw tips 34 are preferably formed of carbide or another suitable material selected for strength, durability, and retention of sharpness of the cutting surface, particularly in view of the material of the workpiece 14. While workpiece 14 is in a preferred embodiment a wooden slat, the system of the present invention could be used as easily to make similar cuts in other wood items, plastic, engineered wood, metal, composites, or any other material in which box cuts might be made using a circular saw.

Figure 3B:
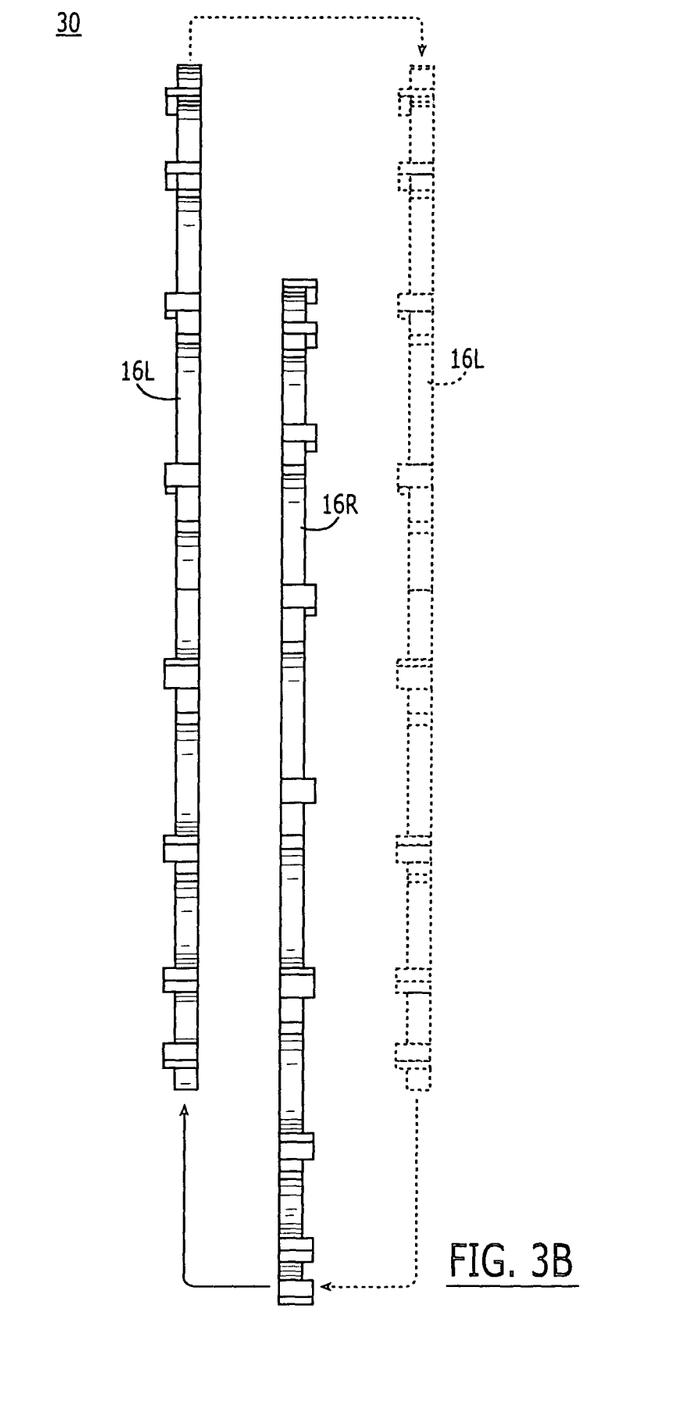
Figure 3C:
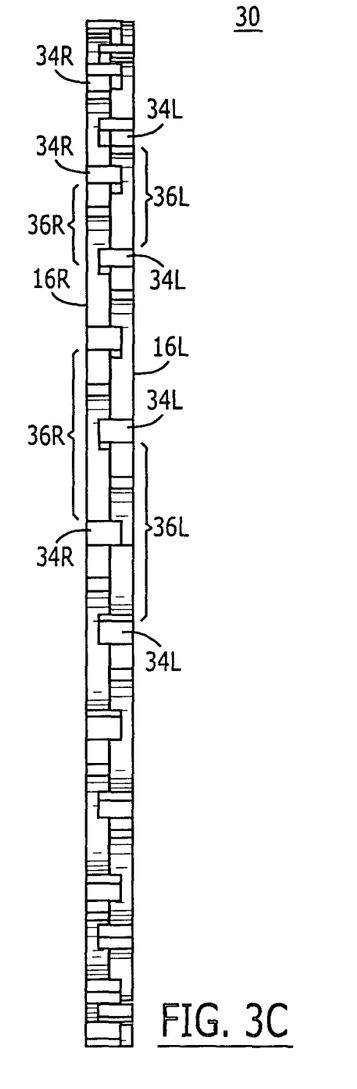

Referring now to FIGS. 3A to 3C, a blade system 30 according to the present invention is shown in additional detail relating to the versatility of the system. In FIG. 3A, the blades 16 are shown in a "wide" configuration, a first configuration in which the left saw tips 34L and the right saw tips 34R are outwardly offset from each other. In FIG. 3B, the blades 16 are being transitioned to the second configuration, a "narrow" configuration. In this "narrow" second configuration, shown in FIG. 3C, the left saw tips 34L and the right saw tips 34R are inwardly offset from each other.

As can be seen in FIG. 3C, in the aforesaid second configuration, a portion of each of the saw tips 34 of each of the blade members 16L,16R is disposed within one of the gullets 36R, 36L of the other blade member 16R,16L. In the second configuration, then, the cutting width of the blade system is substantially reduced. In this manner, the same blades 16 may be used to produce grooves of two different sizes. Those skilled in the art will recognize that box joint cuts are typically made in a few standard sizes, and that the versatility of a box-joint blade system is desirable, in the context of dedicating blades to a specific purpose, because a single set of blades used for two different sizes cuts in half the acquisition costs of blades for making box joints.

As can be seen in FIG. 3A, in a preferred embodiment the saw tips 34 are substantially wider than the saw plates 32, such that axially offsetting the saw tips 34 from the saw plates 32 leaves a small portion of each the saw tips 34 disposed within the gullets 36 of the opposite blade even in the first configuration. While this feature is necessarily dependent upon the dimensions of the saw plates 32 and the saw tips 34, when it is present in an embodiment of the present invention, the blades 16 may be set in an interlocking relationship with each other in a 180° out-of-phase arrangement, even in the "wide" configuration.

Figure 4A:
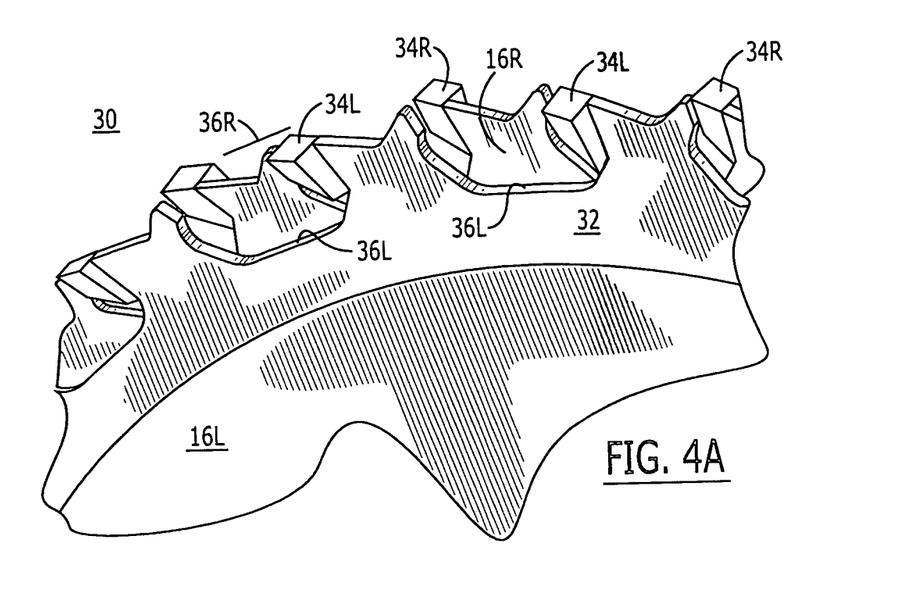
FIGS. 4A-4B are detailed views of blades according to the present invention, in wide-kerf and narrow-kerf configurations, respectively.
Figure 4B:
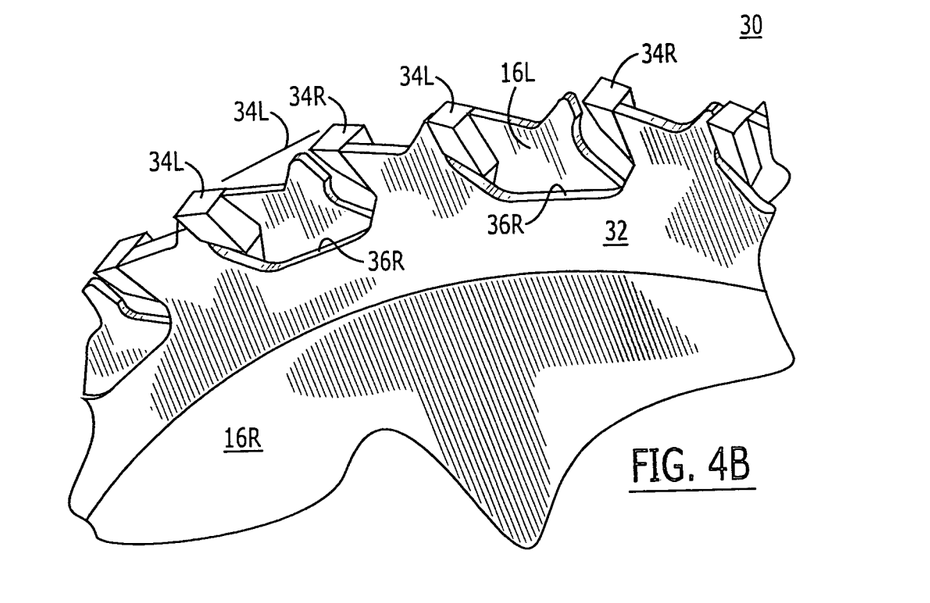

FIGS. 4A and 4B are detailed views which illustrate the blades 16L, 16R, in the box joint blade system 30 showing the alignment of the tips 34L, 34R, and the gullets 36L, 36R. As can be seen in either figure, the tips 34L, 34R, are substantially wider than, and are axially offset from, the plane of the saw plate 32 with respect to the axis of rotation of the blades.

In FIG. 4A, the "wide" configuration of the blade system 30 is illustrated. The left blade 16L is configured such that the tips 34L thereof are axially offset away from the right blade 16R, and the right blade 16R is configured such that the tips 34R thereof are axially offset away from the left blade 16L. This causes the cutting path or kerf of the blade system to have its maximum width, because there is little or no overlap between the two sets of saw tips 34L, 34R.

In FIG. 4B, the blades 16 are reversed from their positions as shown in FIG. 4A in the "narrow" configuration. Because the left blade 16L is now positioned to the right of the right blade 16R, the tips 34L are axially offset toward the right blade 16R. Likewise, the tips 34R are axially offset toward the left blade 16L. In this manner, the kerf width of the blade system 30 in the "narrow" configuration shown in FIG. 4B is narrower, because there is considerable overlap between the two sets of saw tips 34L, 34R. This overlap is accommodated by radially offsetting the two blades 16 by 180° out of phase, such that the saw tips 34 may extend into the gullets 36 of the other blade 16.

Figure 5:
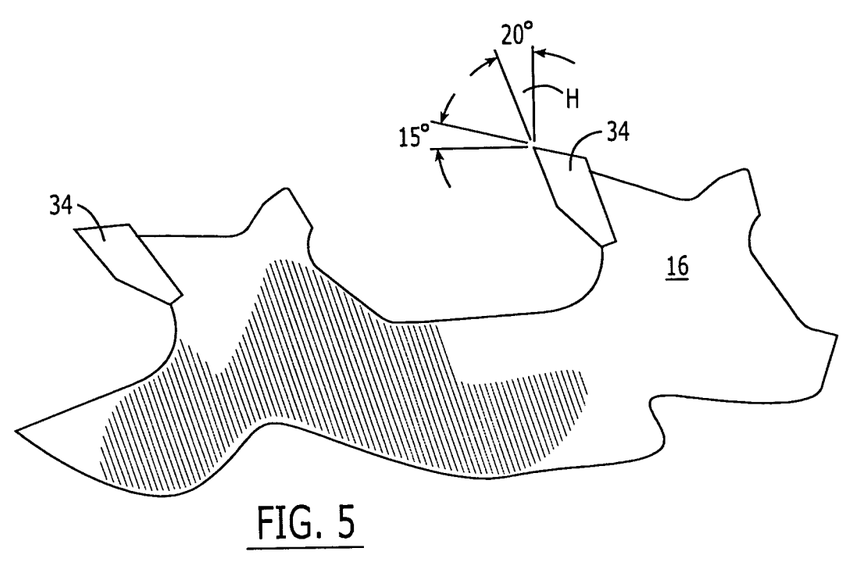
FIG. 5 is a detailed side view of a blade according to the present invention, illustrating the hook angle of the tips.

In FIG. 5, a side detail view of a blade 16 according to the present invention illustrates the hook angle H of the saw tips 34 of the blade 16 in a preferred embodiment. Although in the present invention it is possible to employ a negative hook angle for various purposes, a positive hook angle such as is illustrated is preferred for operations involving wooden box-making. The positive hook angle ensures a quick, smooth-bottomed cut, which is preferred for box joint-making operations because of the degree of precision required for a tight fit. For various operations, it is preferred to employ a hook angle H of about 10° positive, 15° positive, 20° positive, or more.

Figure 6:
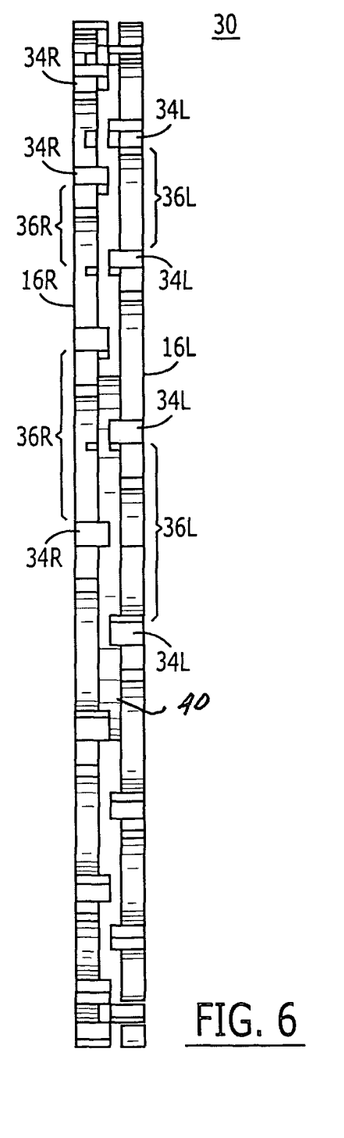
FIG. 6 is a side view of an alternative embodiment of the present invention.

Referring now to FIG. 6, an alternative embodiment of the present invention is shown in an edge-on view of the blades as in FIG. 3A. By interposing one or more shims 40 between the left and right blades 16L, 16R, it is possible to make the kerf width wider, by the width of the shim or shims 40, lending even greater versatility to the present invention.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A blade apparatus for a rotary saw having an axis, comprising:
    a left-directed blade member comprising a first saw plate, a plurality of first saw tips extending from the first saw plate, and a plurality of first gullets formed between the plurality of first saw tips, each of the plurality of first saw tips axially offset to the left of the first saw plate and defining a portion of a respective one of the plurality of first gullets; and
    a right-directed blade member comprising a second saw plate, a plurality of second saw tips extending from the second saw plate, and a plurality of second gullets formed between the plurality of second saw tips, the plurality of second saw tips axially offset to the right of the second saw plate and defining a portion of a respective one of the plurality of second gullets;
    the left-directed and right-directed blade members are selectively mountable in in each of two alternative axially aligned configurations comprising a first configuration, in which the plurality of first saw tips and the plurality of second saw tips are outwardly offset to produce a wide groove, and a second configuration, in which the plurality of first saw tips and the plurality of second saw tips are inwardly offset to produce a narrow groove; and
    in at least the second configuration, a portion of each of the plurality of second saw tips is disposed within a respective one of the plurality of first gullets.

2. A blade apparatus according to claim 1, wherein each of the plurality of first saw tips is provided with a positive hook angle.

3. A blade apparatus according to claim 1, wherein each of the plurality of first saw tips is provided with a positive hook angle of greater than about 10°.

4. A blade apparatus according to claim 1, wherein each of the plurality of first saw tips is provided with a positive hook angle of greater than about 15°.

5. A blade apparatus according to claim 1, wherein each of the plurality of first saw tips is provided with a positive hook angle of greater than about 20°.

6. A blade apparatus according to claim 1, wherein the blade members are arranged to create a smooth flat-bottomed wide groove suitable for forming a box joint groove in a work piece.

7. A blade apparatus according to claim 1, wherein the blade members are configured for cooperating engagement in at least the second configuration.

8. A blade apparatus according to claim 1, further comprising:
    at least one shim disposed between the blade members to vary the width of the narrow groove.

9. A system for forming box joint members in a work piece using a table saw, comprising:
    a first blade mountable upon the table saw, the first blade having first tips and first gullets disposed circumferentially thereon in spaced relation, each of the first tips being connected to and axially offset from a first saw plate in a first axial direction and defining a portion of a respective one of the first gullets; and
    a second blade mountable upon the table saw, the second blade having second tips and second gullets disposed circumferentially thereon in spaced relation, the second tips being connected to and axially offset from a second saw plate in a second axial direction opposite the first axial direction;
    wherein the first and second blades are selectively mountable coaxially relative to one another in each of two alternative operating dispositions comprising a first disposition in which the first tips and the second tips are outwardly offset with respect to each other to form in the work piece a first groove having a first width, and in a second disposition in which the first tips and the second tips are inwardly offset with respect to each other to form in the work piece a second groove having a second width different from the first width, with at least a portion of each of the second tips extending axially into a corresponding first gullet when in the second disposition.

10. A system according to claim 9, wherein a hook angle of the first tips is positive.

11. A system according to claim 9, wherein a hook angle of the first tips is greater than about 10° positive.

12. A system according to claim 9, wherein a hook angle of the first tips is greater than about 15° positive.

13. A system according to claim 9, wherein a hook angle of the first tips is greater than about 20° positive.

14. A system according to claim 9, wherein the first groove comprises a flat-bottomed groove.

15. A system according to claim 9, wherein the blades are configured for cooperating engagement during operation.

16. A system according to claim 9, further comprising:
at least one shim disposed between the first and second blades to increase the width of the second groove.

17. A blade apparatus for a rotary saw having an axis, comprising:
a left-directed blade member comprising a first saw plate, a plurality of first saw tips extending from the first saw plate, and a plurality of first gullets formed between adjacent first saw tips, each of the first saw tips axially offset to the left of the first saw plate and defining a portion of a respective one of the plurality of first gullets; and
a right-directed blade member comprising a second saw plate, a plurality of second saw tips extending from the second saw plate, and a plurality of second gullets formed between adjacent second saw tips, each of the second saw tips axially offset to the right of the second saw plate and defining a portion of a respective one of the plurality of second gullets;
wherein the left-directed and right-directed blade members are adapted to be mounted along the axis selectively in each of two alternative configurations comprising a first configuration, in which the plurality of first saw tips and the plurality of second saw tips are outwardly offset to produce a wide groove, and a second configuration, in which the plurality of first saw tips and the plurality of second saw tips are inwardly offset to produce a narrow groove; and
wherein in at least the second configuration, a portion of each of the plurality of second saw tips is disposed within a respective one of the plurality of first gullets.

18. A blade apparatus according to claim 17, wherein each of the plurality of first saw tips is provided with a positive hook angle.

19. A blade apparatus according to claim 17, wherein each of the plurality of first saw tips is provided with a positive hook angle of greater than about 10°.

20. A blade apparatus according to claim 17, wherein each of the plurality of first saw tips is provided with a positive hook angle of greater than about 15°.

21. A blade apparatus according to claim 17, wherein each of the plurality of first saw tips is provided with a positive hook angle of greater than about 20°.

22. A blade apparatus according to claim 17, wherein the blade members are arranged to create the wide groove with a smooth flat bottom suitable for forming a box joint with a work piece.

23. A blade apparatus according to claim 17, wherein the blade members are configured for cooperating engagement in at least the second configuration.

24. A blade apparatus according to claim 17, further comprising:
at least one shim disposed between the blade members to vary the width of the narrow groove.

\* \* \* \* \*